United States Patent
Hu et al.

(10) Patent No.: US 8,818,934 B2
(45) Date of Patent: Aug. 26, 2014

(54) TRANSPARENT SUPPORT FOR DISTRIBUTED TRANSACTIONS IN A CLUSTERED DISK-SHARING DATABASE ENVIRONMENT

(75) Inventors: Yong Hu, Foster City, CA (US); Bipul Sinha, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 1420 days.

(21) Appl. No.: 12/048,161

(22) Filed: Mar. 13, 2008

(65) Prior Publication Data
US 2009/0235255 A1     Sep. 17, 2009

(51) Int. Cl.
G06F 17/30     (2006.01)

(52) U.S. Cl.
USPC ............................ 707/607; 718/101; 718/105

(58) Field of Classification Search
USPC ........................................................ 718/101
See application file for complete search history.

(56) References Cited

U.S. PATENT DOCUMENTS

| | | | |
|---|---|---|---|
| 6,981,004 B2 | 12/2005 | Ganesh | |
| 6,983,286 B1 | 1/2006 | Sinha | |
| 7,240,065 B2 | 7/2007 | Yang | |
| 7,251,660 B2 | 7/2007 | Yang | |
| 7,346,690 B1 | 3/2008 | Sinha | |
| 7,401,084 B1 | 7/2008 | Sinha | |
| 7,437,525 B2 | 10/2008 | Yang | |
| 7,552,149 B2 | 6/2009 | Sinha | |
| 7,571,173 B2 | 8/2009 | Yang | |
| 7,624,112 B2 | 11/2009 | Ganesh | |
| 7,752,181 B2 | 7/2010 | Klein | |
| 7,840,551 B2 | 11/2010 | Wong | |
| 7,849,221 B2 * | 12/2010 | Kumar et al. | ............... 709/248 |
| 7,873,605 B2 | 1/2011 | Bhattacharyya | |
| 7,885,939 B2 | 2/2011 | Krishnaswamy | |
| 7,941,408 B2 | 5/2011 | Sinha | |
| 7,953,749 B2 | 5/2011 | Sinha | |
| 7,962,481 B2 | 6/2011 | Ganesh | |
| 8,015,161 B2 | 9/2011 | Sinha | |
| 8,032,496 B2 | 10/2011 | Sinha | |
| 8,037,040 B2 | 10/2011 | Vemuri | |
| 8,185,508 B2 | 5/2012 | Vemuri | |
| 2004/0019684 A1 * | 1/2004 | Potter et al. | ................... 709/227 |
| 2005/0114409 A1 | 5/2005 | Sinha | |
| 2005/0256829 A1 | 11/2005 | Yang | |
| 2006/0149791 A1 | 7/2006 | Sinha | |

(Continued)

OTHER PUBLICATIONS

Website Name is: Oracle Website Link is: https://forums.oracle.com/forums/thread.jspa?threadID=814714 Oct. 16, 2002.*

*Primary Examiner* — Anteneh Girma
(74) *Attorney, Agent, or Firm* — Vista IP Law Group, LLP

(57) ABSTRACT

A method, system and computer program product for transparent support for distributed transactions in a clustered disk-sharing database environment is disclosed. In one approach, a method, a system and a computer program product are disclosed that disassociate a transaction with a session at a first resource manger, send a request to a second resource manager for the transaction that requires access to stored transaction information from prior requests for the transaction, determine whether the second resource manager has access to transaction information for the transaction stored using the session that has been disassociated with the transaction, obtain an identity of the first resource manager in data shared by the first and the second resource managers, and request access to the transaction information at the first resource manager.

22 Claims, 5 Drawing Sheets

(56) References Cited

U.S. PATENT DOCUMENTS

| | | | |
|---|---|---|---|
| 2007/0078911 A1* | 4/2007 | Lee et al. | 707/204 |
| 2007/0288529 A1 | 12/2007 | Ganesh | |
| 2008/0098045 A1 | 4/2008 | Radhakrishnan | |
| 2008/0243865 A1 | 10/2008 | Hu | |
| 2009/0037367 A1* | 2/2009 | Wein | 707/2 |
| 2009/0235255 A1 | 9/2009 | Hu | |
| 2011/0302205 A1 | 12/2011 | Sinha | |

* cited by examiner

TRANSPARENT SUPPORT FOR DISTRIBUTED TRANSACTIONS IN A CLUSTERED DISK-SHARING DATABASE ENVIRONMENT

FIELD

Embodiments of the invention relate to computer systems, and more particularly to databases.

BACKGROUND OF THE INVENTION

A database transaction is a unit of interaction with a database management system that is serviced by the management system independent of other transactions. Ideally, a database management system guarantees the properties of atomicity, consistency, isolation and durability for each transaction. A distributed transaction performs the work for the transaction at two or more network nodes. Each network node may have a resource manager, such as a database server, that resides on the network node to service client requests for a distributed transaction. A transaction manager, such as a component of an application server, may coordinate the completion or recovery of a distributed transaction on all resource managers involved in the transaction.

Resource managers running on network nodes may operate in a shared mode such that multiple instances of the resource managers can concurrently read and write to the same resource. For example, a database management system can have database server instances on multiple nodes that are connected to each other with a high-speed network in a clustered environment and share the same data files on disk. Such clustered disk-sharing database systems are commercially available from Oracle Corporation (e.g., Oracle 10g or later versions), known as Oracle Real Application Clusters (RAC). A load balancer of a clustered database system may then route the requests made by the clients to any database server in the system and it is beneficial for each database server in the clustered environment to be able to service the requests made by external clients as a single database management system.

Application Programming Interfaces (API) for distributed transactions, such as implementations of the Distributed Transaction Processing: The XA Specification standard, are used by transaction managers to communicate with the resource managers. Standards for APIs provide an agreed-upon set of guidelines for interoperability. The XA standard interface includes commands (e.g. xa_end( )) for the transaction manager to disassociate an active transaction from any sessions between the transaction manager and the resource managers. For example, a transaction manager can request to disassociate with the resource manager session and later request to prepare to commit the transaction. To prepare to commit the transaction, the resource manager will need to respond with the preparation status for all resource managers involved in committing the transaction. In a clustered database system that uses load balancing, a preparation to commit request may not be routed to the same resource manager for which the prior work for the transaction and corresponding transaction information is stored. If a resource manager that receives a preparation to commit client request for a transaction does not have the transaction information, then the resource manager cannot service the preparation to commit request. Thus, it would be beneficial for the resource manager to allow access to the transaction information for subsequent transaction requests after the session has been disassociated from the transaction.

Approaches for implementing the interface standards for distributed transactions restrict the transaction manager to accessing the same resource manager instance that was used to perform work for the transaction. This is because the transaction manager is restricted to using only one resource manager for the duration of the transaction (e.g. implementing a Singleton design pattern). For example, as shown in FIG. 1, the Client Application 100 requests that the Transaction Manager 102 perform work for a transaction. The Transaction Manager 102 uses Interface 104 methods to communicate with the Database Cluster 106 that has Database Storage 116 for the data of the Database Cluster 106. Initially, the Database Cluster 106 routes the requests for transaction "trx1" to Resource Manager1 108 instead of Resource Manager2 110 and the transaction information for transaction "trx1", trx1 Information 112, is stored in the Memory1 114. All subsequent Interface 104 requests to the Database Cluster 106 will be restricted to the database server instance Resource Manager1 108. In order to provide access to the instance of the database server with the transaction information, Resource Manager1 108 may reserve the session for the Transaction Manager 102 for the duration of the transaction. The consequences for reserving the session for a transaction manager for the duration of a transaction results in a significant strain on the resources of a database management system. Thus, there is a need for a solution to implement the interface without straining resources of the database management system.

SUMMARY OF THE INVENTION

A method, system and computer program product for transparent support for distributed transactions in a clustered disk-sharing database environment is disclosed. In one embodiment, methods, systems, and computer program products are disclosed that disassociate a transaction with a session at a first resource manger, send a request to a second resource manager for the transaction that requires access to stored transaction information from prior requests for the transaction, determine whether the second resource manager has access to transaction information for the transaction stored using the session that has been disassociated with the transaction, obtain an identity of the first resource manager in data shared by the first and the second resource managers, and request access to the transaction information at the first resource manager.

BRIEF DESCRIPTION OF THE DRAWINGS

The invention is illustrated by way of example and not limitation in the figures of the accompanying drawings, in which like references indicate similar elements and in which.

DETAILED DESCRIPTION

Embodiments of the present invention provide methods, systems and computer program products for implementation of transparent support for distributed transactions in a clustered database environment.

In a clustered database system, a transaction request for a distributed transaction may not be routed to the same resource manager or database server that serviced the prior transaction requests for the distributed transaction and stores corresponding transaction information for the distributed transaction. This may occur when a transaction or portion of a transaction has become disassociated from a session at the resource manager that was used to service the prior transaction requests. However, a resource manager, including a resource manager which did not initially service the transaction in a database system may need access to the transaction information after the transaction is no longer associated with a session. Embodiments of the present invention provide access to transaction information at a resource manager after a transaction has been disassociated from a session at the resource manager.

Figure 1:
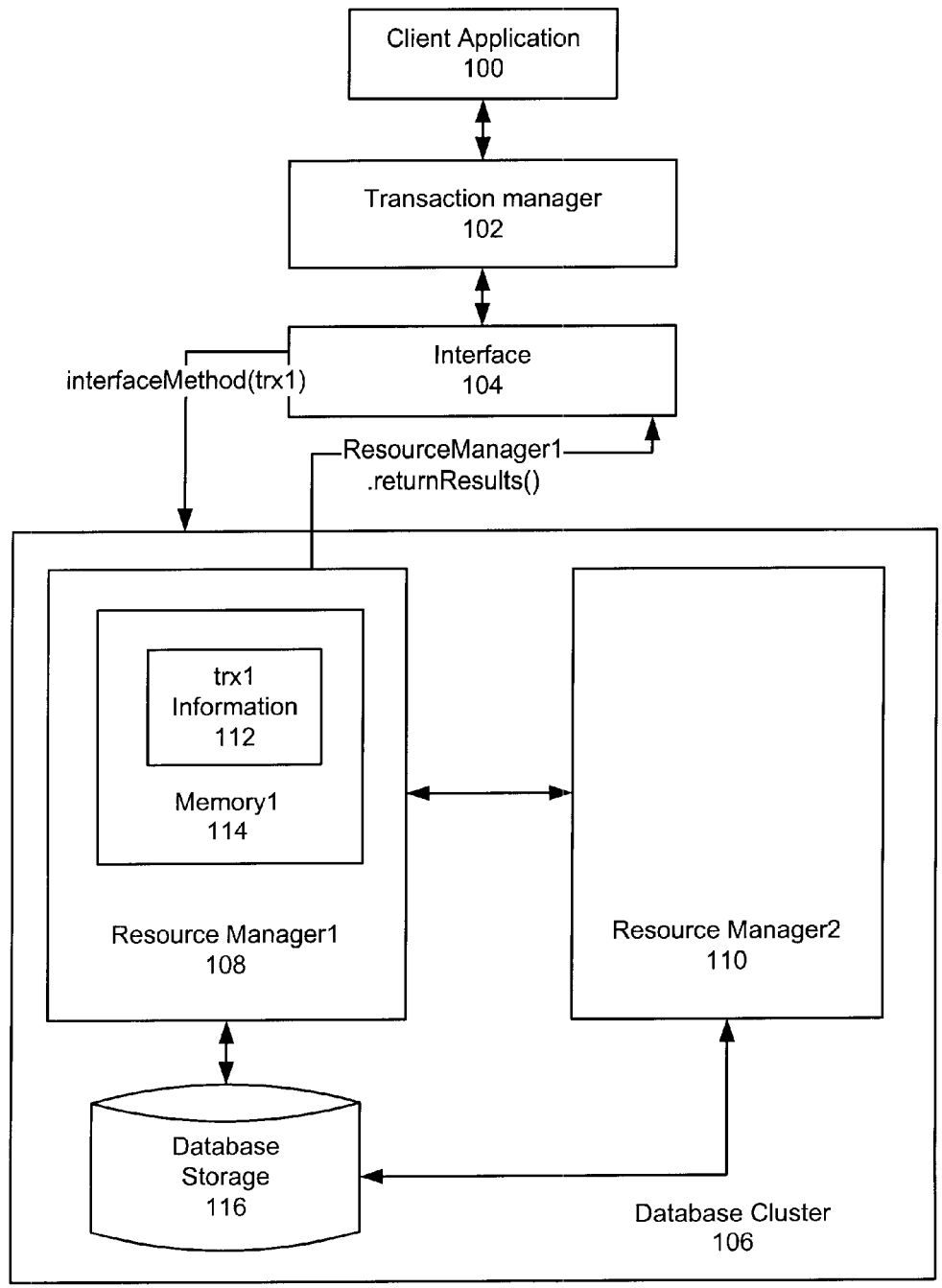
FIG. 1 show block diagram of the prior art.
Figure 2:
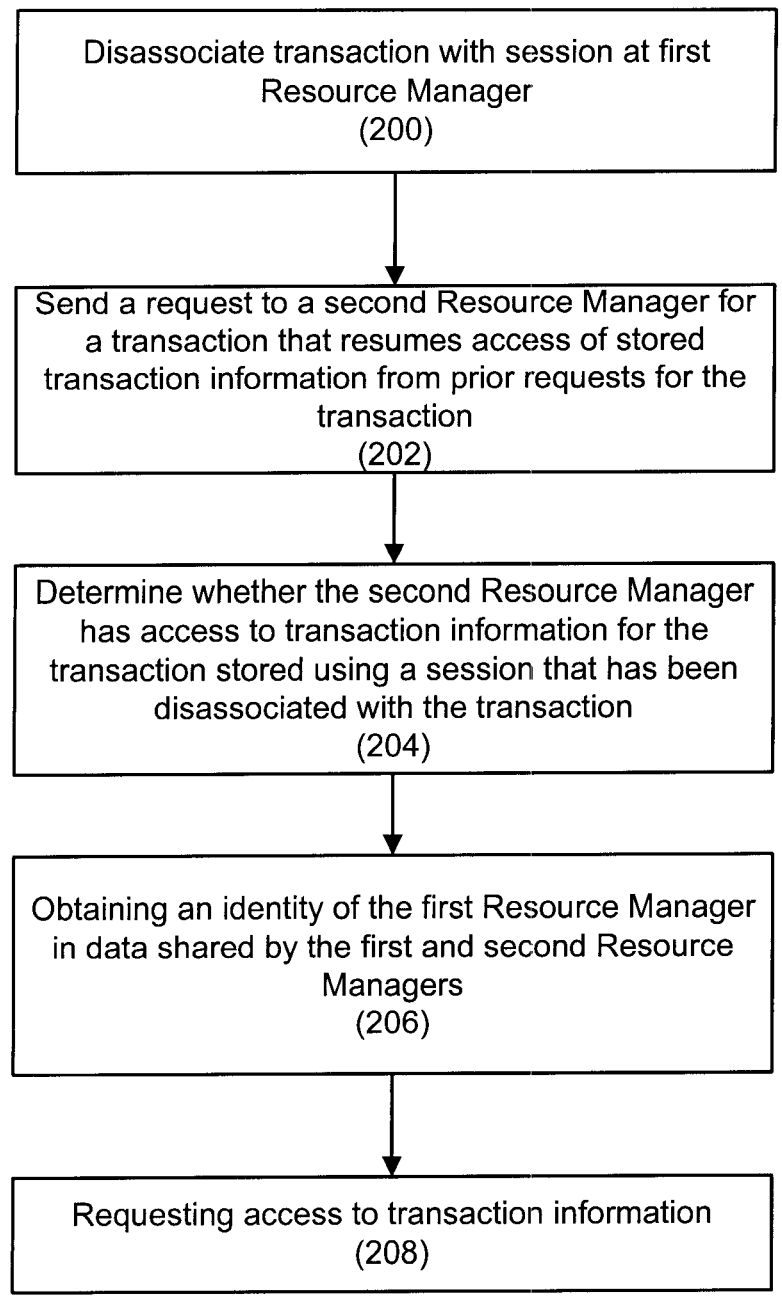
FIG. 2 is a flowchart for an implementation of transparent support for distributed transactions in a clustered database environment.

FIG. 2 is a flowchart for an implementation of transparent support for distributed transactions in a clustered database environment. Initially, a transaction is disassociated from a session at a first Resource Manager (200). Transaction managers, such as implemented with application servers, may cause a disassociation with a session of a resource manager for a transaction during the course of requesting work for a transaction. The XA interface provides a command (e.g., xa_end( )) that allows a transaction manager to disassociate a transaction from a session. For a database system provided by Oracle Corporation, the Oracle Call Interface may accomplish similar tasks with interface calls such as OCITransDetach( ).

Next, a request is sent to a second Resource Manager for a transaction that uses stored transaction information from prior requests for the transaction (202). A Transaction Manager may send requests to a database system supported by multiple Resource Managers. The Transaction Manager may send a transaction request to the database system and expect a Resource Manager of the database system to have access to transaction information on prior requests to the database system for the transaction. For example, for a prepare to commit request, a Resource Manager should have information regarding whether all Resource Managers supporting the transaction are prepared to commit the transaction and may need access to transaction information at Resource Managers no longer associated with the transaction.

Next, it is determined whether the second Resource Manager has the transaction information for the transaction previously serviced by the first Resource Manager (204). If the second Resource Manager was not the resource manager used in prior requests by the transaction manager, then the second Resource Manager may not have the transaction information available. Further, the second Resource Manager may not have knowledge that the transaction information for prior transaction requests even exists.

The identity of the first Resource Manager that contains the transaction information may be obtained or looked up in data shared by the first and second Resource Managers to allow the second Resource Manager to handle a request that requires transaction information stored at the first Resource Manager (206). In one or more embodiments, the identity of the resource manager that contains the transaction information can be obtained by accessing shared data maintained by distributed lock managers. According to some embodiments, the lock manager maintains a list of system resources and provides a locking mechanism within the clustered database environment. The lock manager may coordinate concurrent accesses of multiple server instances to shared resources, such as data blocks and undo segments. The data maintained by the distributed lock managers may be synchronized between the instances of resource managers to ensure that the data is accurate. Embodiments may access the information maintained by a lock manager with a transaction name that has been assigned to the transaction or a lock name associated with the transaction. In one or more embodiments, a lock manager for a resource manager may forward requests to a peer lock manager at a peer resource manager to obtain the transaction information.

Next, access may be requested to the transaction information available at the first Resource Manager (208). The transaction request may then be routed to the first Resource Manager or resource manger that has been identified by the distributed lock managers with the shared data. Alternatively, the second Resource Manager may request access to the transaction information and handle the request at the second Resource Manager. In one or more embodiments, a resource manager may receive the request to prepare for the commit, convert the request to a lock acquisition request and send it to distributed lock managers in order to perform the preparation for the commit of the transaction. Embodiments may have one or more processes running in the background to back up distributed lock managers to handle such requests. The second Resource Manager may receive the results of the request handled by the first Resource Manager and return the results to the requesting Transaction Manager.

Figure 3:
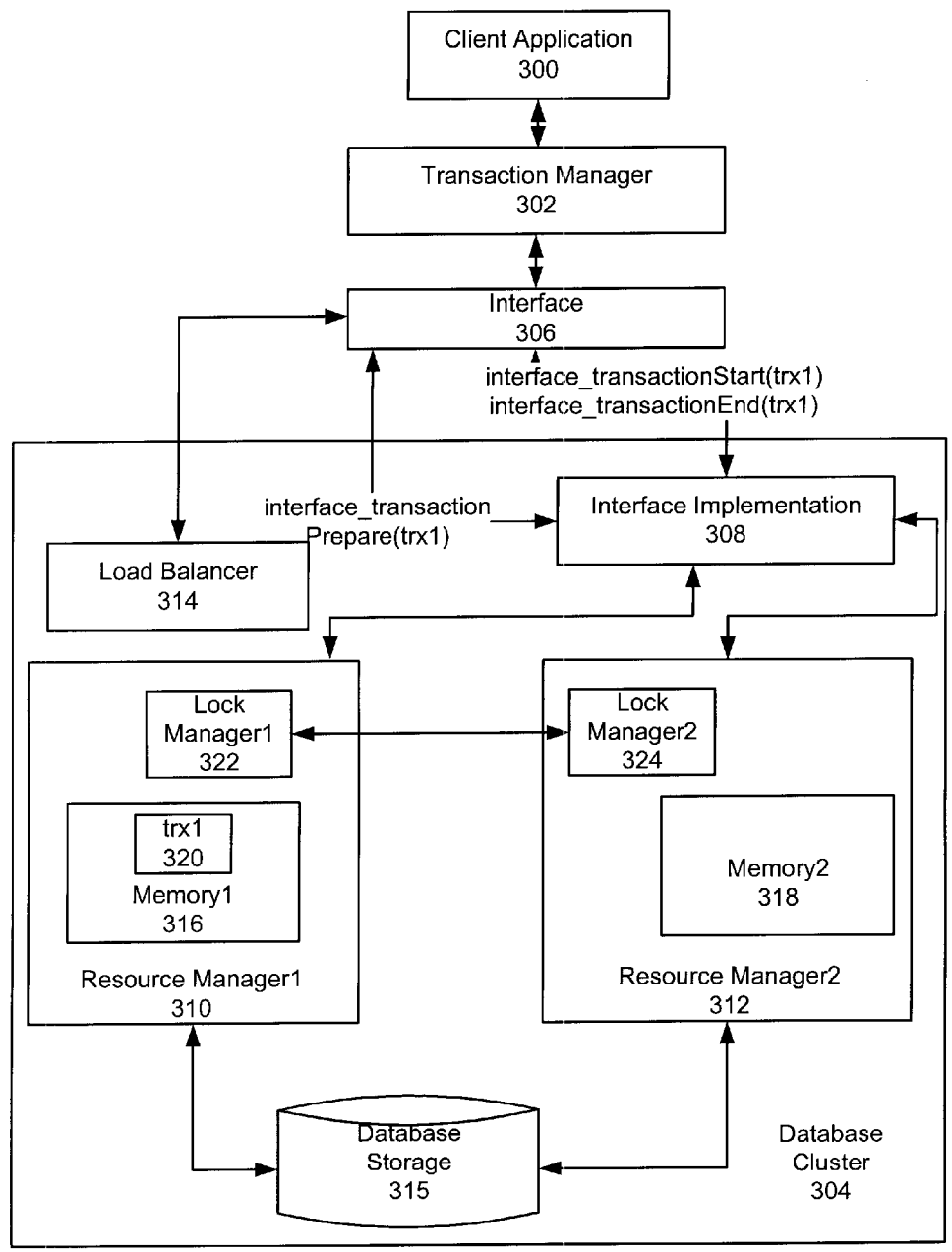
FIG. 3 is a block diagram for an implementation of transparent support for distributed transactions in a clustered database environment.

FIG. 3 is a block diagram for an implementation of transparent support for distributed transactions in a clustered database environment. A Client Application 300 may use a Transaction Manager 302 to coordinate the completion or recovery of a transaction on all resource mangers involved in the distributed transaction. Embodiments may use an application server with a component that serves as a Transaction Manager 302. The Transaction Manager 302 communicates with the Database Cluster 304 using the Interface 306. The Interface 306 may be a standard interface, such as the XA interface, allowing interoperability with multiple database management systems.

The Interface Implementation 308 of the Database Cluster 304 is an interface implementation for the Interface 306 that allows for communication with the resource managers of the Database Cluster 304, Resource Manager1 310 and Resource Manager2 312. Embodiments may employ the use of a Load Balancer 314 to ensure that requests for the resource managers are evenly distributed or distributed in accordance with requirements for the Database Cluster 304. Interface implementations may provide calls to the Load Balancer 314 and route server requests through the Load Balancer 314 transparently. In one or more embodiments, the resource managers are database servers that access the shared resource, a Database Storage 315.

Resource Manager1 310 and Resource Manager2 312 have storage, such as memory illustrated with Memory1 316 and Memory2 318 respectively, to store data in order to service the transaction requests by the Transaction Manager 302. In one or more embodiments, each resource manager may have a cache to store frequently accessed or recently accessed results of transaction requests. The results in the cache or memory may be shared between resource managers to ensure that a single image of the state of the database is reflected to external transaction managers in transaction requests against the database serviced by the resource managers. In order for a transaction manager to send requests to the resource managers, a session is established between the resource manager and the transaction manager. A session is a lasting connection between a transaction manager and a resource manager using the session layer of a network protocol.

Transaction information 320, illustrated with the name "trx1", may be stored in the memory of a resource manager to represent the current state of a transaction initiated during a session. The session at a resource manager may be associated with a transaction or a portion of a distributed transaction, and subsequently, the transaction can become disassociated with a session. For example, Transaction Manager 302 can use the Interface 306 to start a transaction, as illustrated with "interface_transactionStart(trx1)", to begin a transaction and an association with a session on Resource Manager1 310. Similarly, an association with a session can be ended for a transaction, as illustrated with "interface_transactionEnd(trx1)." Transaction information "trx1" 320 may be stored in Memory1 316 of Resource Manager1 310 for the transaction no longer associated with the session at Resource Manager1 310. The transaction information may have been initiated with the session at Resource Manager1 310.

The Transaction Manager 302 may request that one or more resource managers prepare for a commit of the transaction. A two-phase commit approach can be used to ensure completion of a distributed transaction that may be implemented with the Interface 306. In a first phase, the transaction manager requests all involved resource managers to prepare to commit all portions or branches of a distributed transaction at their respective resource managers. In the second phase, the transaction manager issues the actual request to all resource managers to commit or roll back the transaction branch or portion, and all involved resource managers commit or roll back the changes to the shared resources.

The Load Balancer 314 may route a request to prepare commit of a distributed transaction to a resource manager or a session at a resource manager that was not associated with the transaction, when the storage of transaction information is required for the preparation to commit. The resource manager that receives the request to prepare a commit may be different from the original resource manager where the transaction and necessary transaction information was initiated. For example, a session at Resource Manager1 310 was associated with a transaction, named for illustration purposes "trx1" 320 in FIG. 3, and if a prepare to commit request was sent to Resource Manager2 312 after disassociation of the transaction "trx1" with the session at Resource Manager1 310, the Resource Manager2 312 would access the transaction information stored at Memory1 316 at Resource Manager1 310 to respond to the preparation to commit request.

In order to access the transaction information that is no longer associated with a session, embodiments may use shared data between resource managers to retrieve the transaction information. In one or more embodiments, a distributed lock manager may be employed to allow resource managers to access transaction information at other resource managers. A distributed lock manager maintains a list of system resources and provides a locking mechanism within a clustered database environment to coordinate concurrent access of multiple server instances to shared resources, such as data blocks and undo segments. Embodiments may implement a process in the foreground of a resource manager instance that allows the creation of a transaction branch and a lock associated with that transaction branch. Retrieval of the lock may be obtained for subsequent requests for the data blocks and undo segments for the transaction branch with a background process on the resource manager that is responsible for the transaction branch. Those skilled in the art will recognize that there are other forms of shared data between resource managers that may be implemented to retrieve transaction information for a transaction disassociated with a session.

Continuing with FIG. 3, Lock Manager1 322 and Lock Manager2 324, at Resource Manager 1 310 and Resource Manager 2 312 respectively, maintain shared data that allows for the retrieval of the transaction information disassociated with the session at Resource Manager1 310. In one or more embodiments, the lock managers are synchronized to allow for accurate retrieval of the transaction information. After obtaining the identity of the resource manager, Resource Manager1 310, where the transaction information resides, the Resource Manager2 312 requests that the Lock Manager2 324 prepare for a commit of the transaction branch.

Although transparent support for distributed transactions in a clustered database environment is described in reference to the prepare to commit command in a two phase commit, those skilled in the art will recognize that the transparent support can be provided for other commands such as a resumption of a transaction, a rollback, and a commit of a transaction or transaction branch.

Figure 4:
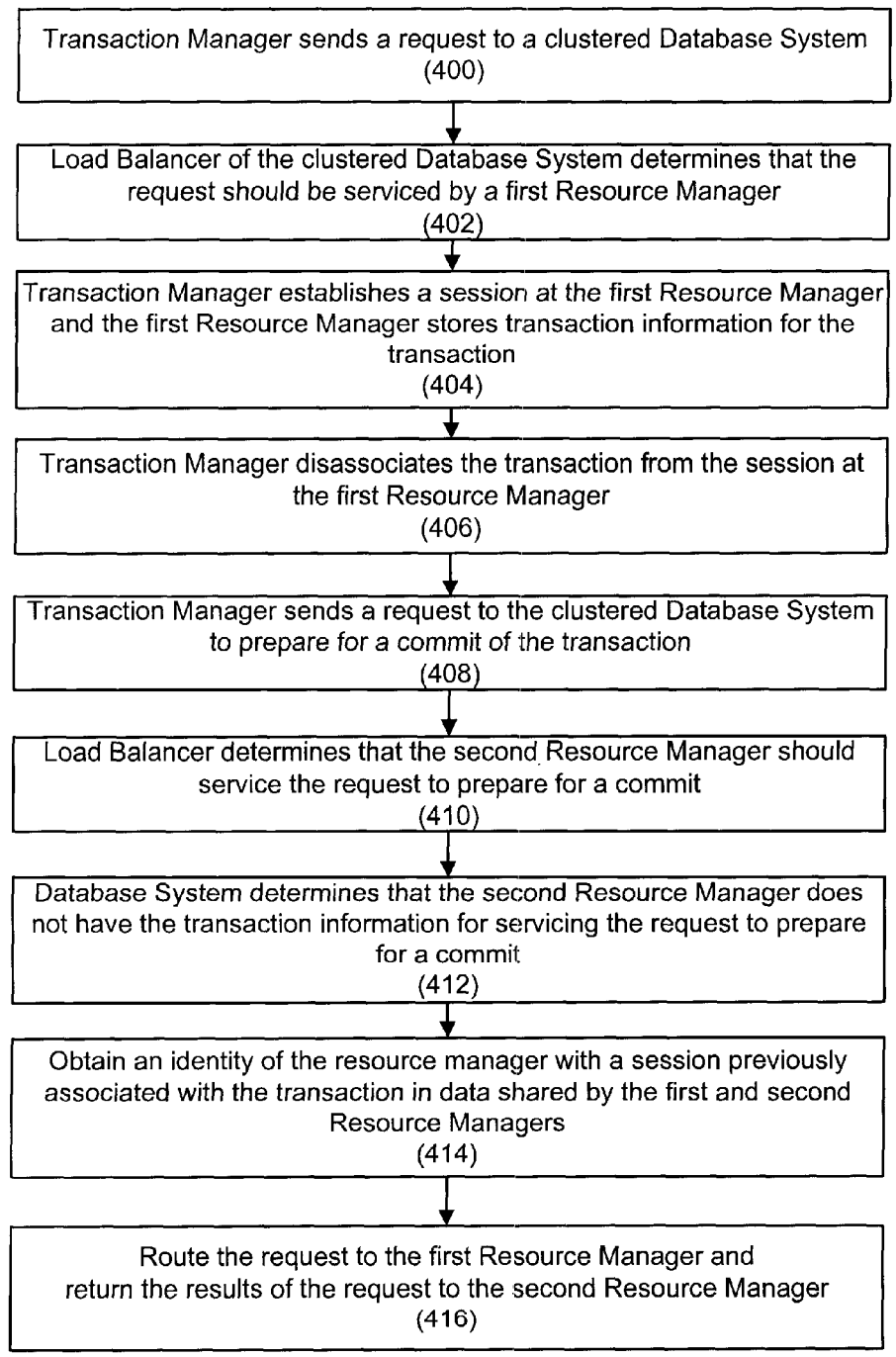
FIG. 4 is flowchart for an implementation of transparent support for distributed transactions in a clustered database environment.

FIG. 4 is flowchart for an implementation of transparent support for distributed transactions in a clustered database environment. Initially, a Transaction Manager 302 sends a request to a Database Cluster 304 (400). A Database Cluster 304 may have multiple resource managers capable of handling requests for the database system. A Load Balancer 314 of a Database Cluster 304 may determine which resource manager of the Database Cluster 304 should service the request (402). A first resource manager, Resource Manager1 310, is selected in accordance with the configuration of the Load Balancer 314 to handle a request (402).

Next, the Transaction Manager 302 establishes a session with a first resource manager for a transaction (404). The session may have been previously created at the resource manager and shared by more than one Transaction Managers 302 to service multiple distributed transactions or portions of distributed transactions. The first resource manager, Resource Manager1 310, stores transaction information for the transaction (404). The first resource manager may initiate and maintain the state information of the transaction. The transaction state information stored at the first resource manager may have information on prior transaction requests for the distributed transaction.

The Transaction Manager 302 may select to disassociate the transaction from the session at the first Resource Manager (406). As discussed above, the Transaction Manager 302 may use the Interface 306 to end the association between the session and the transaction.

Next, the Transaction Manager 302 may send a request to the Database Cluster 304 to prepare for a commit of the transaction (408). The Load Balancer 314 may route the request to a second Resource Manager, Resource Manager2 312, to service the transaction control command "prepare to commit" (410). The Database Cluster 304 may determine whether the second Resource Manager has the transaction information for servicing the command "prepare to commit" (412). The second resource manager may perform a lookup to determine whether it has the in-memory state information for the transaction. Embodiments may give that transaction a name to facilitate the lookup for information of specific transactions on a resource manager.

Next, the identity of the resource manager, where the transaction is initiated and its in-memory state is maintained, may be obtained from data shared between the first and second resource managers (414). As discussed above, a lock manager may be employed to allow for access to the transaction information for the transaction. Embodiments may use the lock manager to service the request that requires transaction information at a resource manager, which had a session previously associated with the transaction, for which the request pertains. Alternatively, the request may be routed to the first resource manager, and the results may be returned to the second resource manager (416).

System Architecture Overview

In the following description, numerous details are set forth for purpose of explanation. However, one of ordinary skill in the art will realize that various embodiments of the invention may be practiced without the use of these specific details. In other instances, well-known structures and devices are shown in block diagram form in order not to obscure the description of various embodiments of the invention with unnecessary detail.

Figure 5:
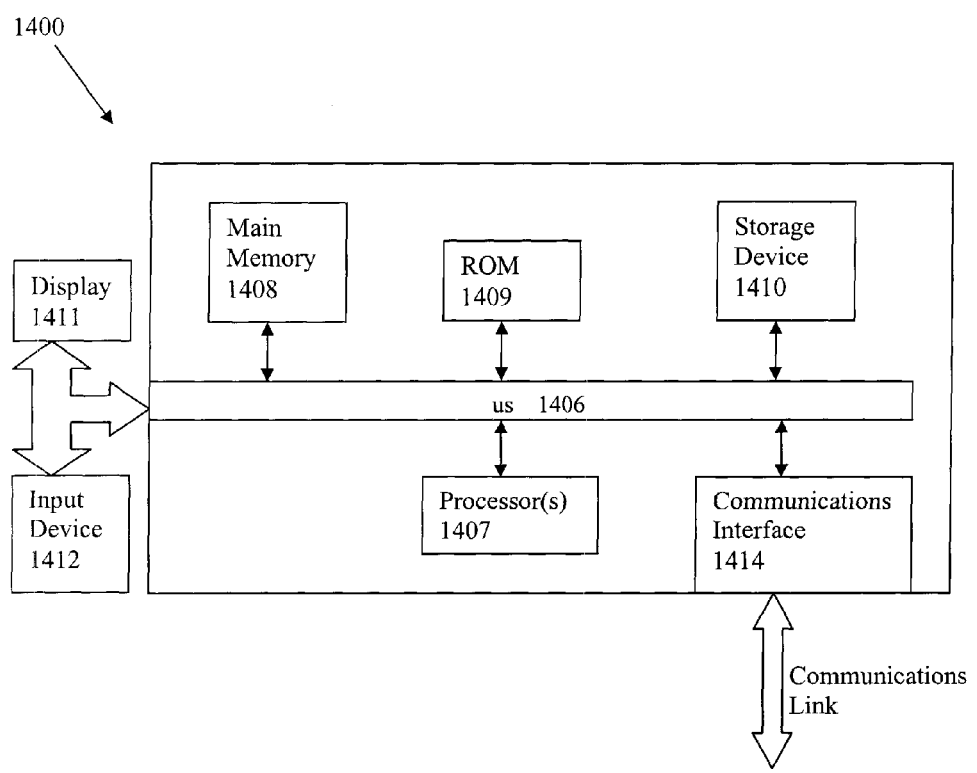
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for transparent support for distributed transactions in a clustered disk-sharing database environment, comprising:

disassociating a transaction with a session at a first resource manager before the transaction completes, wherein transaction information for resuming the transaction is stored at the first resource manager;

sending a request to a second resource manager for resuming the transaction, wherein resuming the transaction requires access by the second resource manager to the stored transaction information and wherein the request for resuming the transaction is sent to the second resource manager for load balancing the clustered disk-sharing database environment;

determining whether the second resource manager has the stored transaction information for resuming the transaction;

obtaining an identity of the first resource manager using data shared by the first and second resource managers when the second resource manager does not have the stored transaction information for resuming the transaction; and requesting access to the transaction information stored at the first resource manager using the identity of the first resource manager when the second resource manager does not have the stored transaction information, wherein the transaction information stored at the first resource manager is accessed after the transaction has been disassociated with the session at the first resource manager and wherein the transaction information stored at the first resource manager is used by the second resource manager to resume the transaction.

2. The method of claim 1, wherein the identity of the first resource manager is obtained from a distributed lock manager.

3. The method of claim 1, wherein the transaction comprises a portion of a distributed transaction.

4. The method of claim 1, wherein the first and second resource managers are database servers.

5. The method of claim 1, wherein the request comprises an XA interface command.

6. The method of claim 1, further comprising:
routing the request to the first resource manager.

7. The method of claim 1, further comprising:
processing the request with the transaction information.

8. The method of claim 1, wherein the first resource manager has an address for the stored transaction information.

9. A computer program product comprising a non-transitory computer usable medium having executable code to execute a process for transparent support for distributed transactions in a clustered disk-sharing database environment, the process comprising:

disassociating a transaction with a session at a first resource manager before the transaction completes, wherein transaction information for resuming the transaction is stored at the first resource manager;

sending a request to a second resource manager for resuming the transaction, wherein resuming the transaction requires access by the second resource manager to the stored transaction information and wherein the request for resuming the transaction is sent to the second resource manager for load balancing the clustered disk-sharing database environment;

determining whether the second resource manager has the stored transaction information for resuming the transaction;

obtaining an identity of the first resource manager using data shared by the first and second resource managers when the second resource manager does not have the stored transaction information for resuming the transaction; and requesting access to the transaction information stored at the first resource manager using the identity of the first resource manager when the second resource manager does not have the stored transaction information, wherein the transaction information stored at the first resource manager is accessed after the transaction has been disassociated with the session at the first resource manager and wherein the transaction information stored at the first resource manager is used by the second resource manager to resume the transaction.

10. The computer program product of claim 9, wherein the identity of the first resource manager is obtained from a distributed lock manager.

11. The computer program product of claim 9, wherein the transaction comprises a portion of a distributed transaction.

12. The computer program product of claim 9, wherein the first and second resource managers are database servers.

13. The computer program product of claim 9, wherein the request comprises an XA interface command.

14. The computer program product of claim 9, further comprising:

routing the request to the first resource manager.

15. The computer program product of claim 9, further comprising:

processing the request with the transaction information.

16. The computer program product of claim 9, wherein the first resource manager has an address for the stored transaction information.

17. A system for transparent support for distributed transactions in a clustered disk-sharing database environment, comprising:

a computer processor to execute a set of program code instructions;

a memory to hold the program code instructions, in which the program code instructions comprises program code to:

disassociate a transaction with a session at a first resource manager before the transaction completes, wherein transaction information for resuming the transaction is stored at the first resource manager;

send a request to a second resource manager for resuming the transaction wherein resuming the transaction requires access by the second resource manager to the stored transaction information and wherein the request for resuming the transaction is sent to the second resource manager for load balancing the clustered disk-sharing database environment;

determine whether the second resource manager has the stored transaction information for resuming the transaction;

obtain an identity of the first resource manager using data shared by the first and the second resource managers when the second resource manager does not have the stored transaction information for resuming the transaction; and request access to the transaction information stored at the first resource manager using the identity of the first resource manager when the second resource manager does not have the stored transaction information, wherein the transaction information stored at the first resource manager is accessed after the transaction has been disassociated with the session at the first resource manager and wherein the transaction information stored at the first resource manager is used by the second resource manager to resume the transaction.

18. The system of claim 17, wherein the identity of the first resource manager is obtained from a distributed lock manager.

19. The system of claim 17, wherein the transaction comprises a portion of a distributed transaction.

20. The system of claim 17, wherein the first and second resource managers are database servers.

21. The system of claim 17, wherein the request is an XA interface command.

22. The system of claim 17, further comprising:

means for routing the request to the first resource manager.

\* \* \* \* \*

UNITED STATES PATENT AND TRADEMARK OFFICE
CERTIFICATE OF CORRECTION

PATENT NO. : 8,818,934 B2  
APPLICATION NO. : 12/048161  
DATED : August 26, 2014  
INVENTOR(S) : Hu et al.

It is certified that error appears in the above-identified patent and that said Letters Patent is hereby corrected as shown below:

On Title page, column 2, item (57) under Abstract, line 6, delete "manger," and insert -- manager, --, therefor.

In the Specification

In column 2, line 17, delete "Mernory1" and insert -- Memory1 --, therefor.

In column 2, line 39, delete "manger," and insert -- manager, --, therefor.

In column 4, line 18, delete "manger" and insert -- manager --, therefor.

In column 4, line 36, delete "manger" and insert -- manager --, therefor.

In column 7, line 63, delete "PTSN," and insert -- PSTN, --, therefor.

In the Claims

In column 8, line 56, in Claim 4, delete "second" and insert -- the second --, therefor.

In column 9, line 39, in Claim 12, delete "second" and insert -- the second --, therefor.

In column 10, line 14, in Claim 17, delete "transaction" and insert -- transaction, --, therefor. (1st occurrence)

In column 10, line 44, in Claim 20, delete "second" and insert -- the second --, therefor.

Signed and Sealed this  
Tenth Day of March, 2015

Michelle K. Lee  
*Deputy Director of the United States Patent and Trademark Office*